United States Patent
Kim

(10) Patent No.: US 9,091,705 B2
(45) Date of Patent: Jul. 28, 2015

(54) SYSTEM AND METHOD FOR HIGH-SPEED ATOMIC FORCE MICROSCOPY WITH SWITCHING BETWEEN TWO FEEDBACK LOOPS

(71) Applicant: Boise State University, Boise, ID (US)

(72) Inventor: Byung I. Kim, Boise, ID (US)

(73) Assignee: Boise State University, Boise, ID (US)

( * ) Notice: Subject to any disclaimer, the term of this patent is extended or adjusted under 35 U.S.C. 154(b) by 87 days.

(21) Appl. No.: 13/875,122

(22) Filed: May 1, 2013

(65) Prior Publication Data

US 2013/0312142 A1 Nov. 21, 2013

Related U.S. Application Data

(63) Continuation of application No. 13/286,059, filed on Oct. 31, 2011, now abandoned, which is a continuation of application No. 12/757,542, filed on Apr. 9, 2010, now Pat. No. 8,549,660.

(51) Int. Cl.
*G01Q 10/06* (2010.01)
*G01Q 20/02* (2010.01)
(Continued)

(52) U.S. Cl.
CPC ............... *G01Q 20/02* (2013.01); *G01Q 30/14* (2013.01); *G01Q 60/38* (2013.01); *G01Q 70/10* (2013.01); *B82Y 35/00* (2013.01)

(58) Field of Classification Search
CPC ..... G01Q 20/02; G01Q 10/065; G01Q 10/06; G01Q 30/04; G01Q 10/04; G01Q 10/045; G01Q 20/04; Y10S 977/87; Y10S 977/85; Y10S 977/851; Y10S 977/868

USPC ................... 850/1, 4, 5, 6, 7, 10, 11
See application file for complete search history.

(56) References Cited

U.S. PATENT DOCUMENTS 5,329,236 A 7/1994 Gemma et al.
5,336,887 A * 8/1994 Yagi et al. ............ 850/1
(Continued)

FOREIGN PATENT DOCUMENTS

JP 3140842 6/1991
JP 6174459 6/1994
JP 2002107284 4/2002

OTHER PUBLICATIONS

Bonander et al., "Cantilever Based Optical Interfacial Force Microscope", Mar. 14, 2008, pp. 1-3, vol. 92, No. 103124, Publisher: Applied Physics Letters.

(Continued)

*Primary Examiner* — Brooke Purinton
(74) *Attorney, Agent, or Firm* — Parsons Behle & Latimer

(57) ABSTRACT

A high-speed atomic force microscope (HSAFM) is disclosed herein. The HSAFM includes a cantilever, a piezotube, an optical detector, a circuit element, and a feedback controller. The cantilever has a probe, and the piezotube is arranged in proximity to the probe. The optical detector is configured to detect deflection of the cantilever, and the circuit element is abutting a first end of the cantilever and is configured to exert a force on the cantilever to resist deflection of the cantilever. The circuit element is communicably connected to the optical detector by a first feedback loop. The feedback controller is communicably connected to the piezotube and configured to modulate the piezotube along the Z-axis towards and away from the probe. And the feedback controller is communicably connected to the optical detector through a second feedback loop.

17 Claims, 9 Drawing Sheets

(51) Int. Cl.
*G01Q 30/14* (2010.01)
*G01Q 60/38* (2010.01)
*G01Q 70/10* (2010.01)
*B82Y 35/00* (2011.01)

(56) References Cited

U.S. PATENT DOCUMENTS

| | | | |
|---|---|---|---|
| 5,357,105 | A | 10/1994 | Harp et al. |
| 5,821,409 | A | 10/1998 | Honma et al. |
| 6,006,594 | A | 12/1999 | Karrai et al. |
| 6,452,170 | B1 | 9/2002 | Zypman et al. |
| 6,530,266 | B1 | 3/2003 | Adderton et al. |
| 6,583,411 | B1 | 6/2003 | Altmann et al. |
| 6,596,992 | B2 | 7/2003 | Ando et al. |
| 6,672,144 | B2 | 1/2004 | Adderton et al. |
| 6,708,556 | B1 | 3/2004 | Kim et al. |
| 6,713,743 | B2 | 3/2004 | Kim et al. |
| 6,718,821 | B1 | 4/2004 | Houston et al. |
| 6,806,958 | B2 | 10/2004 | Kojima et al. |
| 6,862,921 | B2 | 3/2005 | Chand et al. |
| 6,929,934 | B1 | 8/2005 | Korchev et al. |
| 6,975,129 | B2 | 12/2005 | Chang |
| 7,093,509 | B2 | 8/2006 | Shao et al. |
| 7,105,301 | B2 | 9/2006 | Su et al. |
| 7,204,131 | B2 | 4/2007 | Adderton et al. |
| 7,234,343 | B2 | 6/2007 | Ducker et al. |
| 7,241,994 | B2 | 7/2007 | Hasegawa et al. |
| 7,278,296 | B2 | 10/2007 | Kitamura |
| 7,347,085 | B2 | 3/2008 | Taber |
| 7,425,698 | B2 | 9/2008 | Warren et al. |
| 2002/0104963 | A1 | 8/2002 | Mancevski |
| 2006/0027739 | A1* | 2/2006 | Warren et al. ............. 250/234 |
| 2006/0191329 | A1* | 8/2006 | Adderton et al. ............. 73/105 |
| 2007/0290130 | A1 | 12/2007 | Shikakura et al. |
| 2008/0000291 | A1* | 1/2008 | Masser ............. 73/105 |
| 2008/0307864 | A1 | 12/2008 | Uchihashi et al. |
| 2008/0315092 | A1* | 12/2008 | Kley ............. 250/307 |
| 2009/0032706 | A1 | 2/2009 | Prater et al. |
| 2009/0045336 | A1 | 2/2009 | Bloess et al. |
| 2009/0229020 | A1 | 9/2009 | Adams et al. |
| 2010/0071098 | A1* | 3/2010 | Mirkin et al. ............. 850/21 |
| 2010/0154085 | A1 | 6/2010 | Maruyama et al. |

OTHER PUBLICATIONS

T. Sulcheck et al., "High-speed atomic force microscopy in liquid", May 2000, pp. 2097-2099, vol. 71, No. 5, Review of Scientific Instruments, American Institute of Physics.

Byung Kim, "IDBR: RUI: Development of a Cantilever Based Optical Interfacial Force Microscope", Mar. 25, 2010, Award No. 0852886, National Science Foundation, Division of Biological Infrastructure.

Kim et al., "Humidity Dependent Ordering of Water and Its Effect on Adhesion and Friction between Silica Surfaces", Oct. 14, 2007, Volume Abstract # 1353, AVS 54th International Symposium, Tribology Featured Topic.

Kim, et al., "Simultaneous Measurement of Normal and Friction Forces Using Cantilever-Based Optical Interfacial Force Microscope", May 31, 2011, Review of Scientific Instruments, vol. 82, pp. 053711-1 through 5.

Kim, et al., Large Oscillatory Forces Generated by Interfacial Water under Lateral Modulation between Two Hydrophilic Surfaces, Applied Physics Letters/ vol. 99/ Issue 20, pp. 1 through 13, Oct. 22, 2011.

Kim et al., "Scanning Probe Microscopy of Interfacial Water Confined Between Silica Surfaces", Nov. 8, 2009, Abstract # 1070, AVS 56th International Symposium & Exhibition, Surface Science Division.

Kim, et al., "Mechanical Property Investigation of Soft Materials by Cantilever-Based Optical Interfacial Force Microscopy", AFM methods. SCANNING 00: 1-9, 2012. Wiley Periodicals, Inc, publication date Feb. 15, 2013.

Kim, et al., "Force Feedback High-Speed Atomic Force Microscope for Studying Large Biological Systems" Manuscript No. JMIC-D-12-00020R1, Elsevier Editorial System(tm) for Micron, published online May 2, 2012.

* cited by examiner

SYSTEM AND METHOD FOR HIGH-SPEED ATOMIC FORCE MICROSCOPY WITH SWITCHING BETWEEN TWO FEEDBACK LOOPS

CROSS-REFERENCE TO RELATED APPLICATIONS

This application claims the benefit of U.S. Non-Provisional application Ser. No. 12/757,542, titled CANTILEVER-BASED OPTICAL INTERFACIAL FORCE MICROSCOPE, filed on Apr. 9, 2010, and U.S. Non-Provisional application Ser. No. 13/286,059, titled CANTILEVER-BASED OPTICAL INTERFACE FORCE MICROSCOPE, filed on Oct. 31, 2011, which are hereby incorporated by reference in their entirety.

BACKGROUND

Traditional microscope systems are generally unable to measure intermolecular interactions accurately and cost effectively. One type of microscope system is the atomic force microscope (AFM), which has been used to image and/or measure the topography of various surfaces. AFMs, however, suffer from a mechanical instability that prevents the accurate measurement of intermolecular interactions. In particular, AFM's are generally unable to control tip snap-in during tip approach and/or tip snap-off during tip retraction. As a result, AFMs are generally unable to detect intermediate states of various intermolecular interactions such as, for example, the capillary forces between two silicon surfaces.

One limitation in the speed at which an atomic force microscopes may scan a sample is the size of the cantilever. In order to overcome this weakness, typical high-speed atomic force microscopes employ a small cantilever. However, the smaller cantilever of high-speed atomic force microscopes adds complexity to the deflection detection systems, and these systems tend to be limited to between one and ten frames per second.

Another type of microscope system is the interfacial force microscope (IFM). Traditional IFM's use an electrical detection process to measure various surface phenomena. IFM's, however, have not been widely used due to the low sensitivity and technical complexity of their electrical detection process. Thus, traditional microscope systems have generally been unable to measure intermolecular interactions accurately and cost effectively.

SUMMARY

A high-speed atomic force microscope (HSAFM) is disclosed herein. The HSAFM includes a cantilever, a piezotube, an optical detector, a circuit element, and a feedback controller. The cantilever has a probe, and the piezotube is arranged in proximity to the probe. The optical detector is configured to detect deflection of the cantilever, and the circuit element is abutting a first end of the cantilever and is configured to exert a force on the cantilever to resist deflection of the cantilever. The circuit element is communicably connected to the optical detector by a first feedback loop. The feedback controller is communicably connected to the piezotube and configured to modulate the piezotube along the Z-axis towards and away from the probe. And the feedback controller is communicably connected to the optical detector through a second feedback loop.

A method of creating a composite image of a sample using a high-speed atomic force microscope is disclosed herein. The method comprises placing a sample on a piezotube in proximity to a probe of a cantilever, measuring a deflection of the cantilever in response to a force between the sample and the probe, exerting a force on the cantilever, wherein the force is exerted by a circuit element connected to the cantilever to counteract the deflection of the cantilever, measuring the force exerted on the cantilever by the circuit element, and measuring a topographical force at a feedback controller connected to the piezotube.

A system for creating a concurrent deflection image, force image, and topographic image is also disclosed herein. The system comprises a cantilever having a probe, a piezotube arranged in proximity to the probe, and a sample arranged on the piezotube. An optical detector is configured to detect deflection of the cantilever. A circuit element is connected to the cantilever and configured to resist deflection of the cantilever. The circuit element is connected to the optical detector through a first feedback loop. And a feedback controller is connected to the piezotube and configured to modulate the piezotube along the Z-axis away from and towards the probe. The feedback element is connected to the optical detector through a second feedback loop.

BRIEF DESCRIPTION OF THE DRAWINGS

For a more complete understanding of the present disclosure and its advantages, reference is now made to the following description taken in conjunction with the accompanying drawings, in which.

Like reference numbers and designations in the various drawings indicate like elements.

DETAILED DESCRIPTION

In the following detailed description, reference is made to the accompanying drawings that form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that various changes may be made without departing from the spirit and scope of the present disclosure. The following detailed description is, therefore, not to be taken in a limiting sense.

Figure 1:
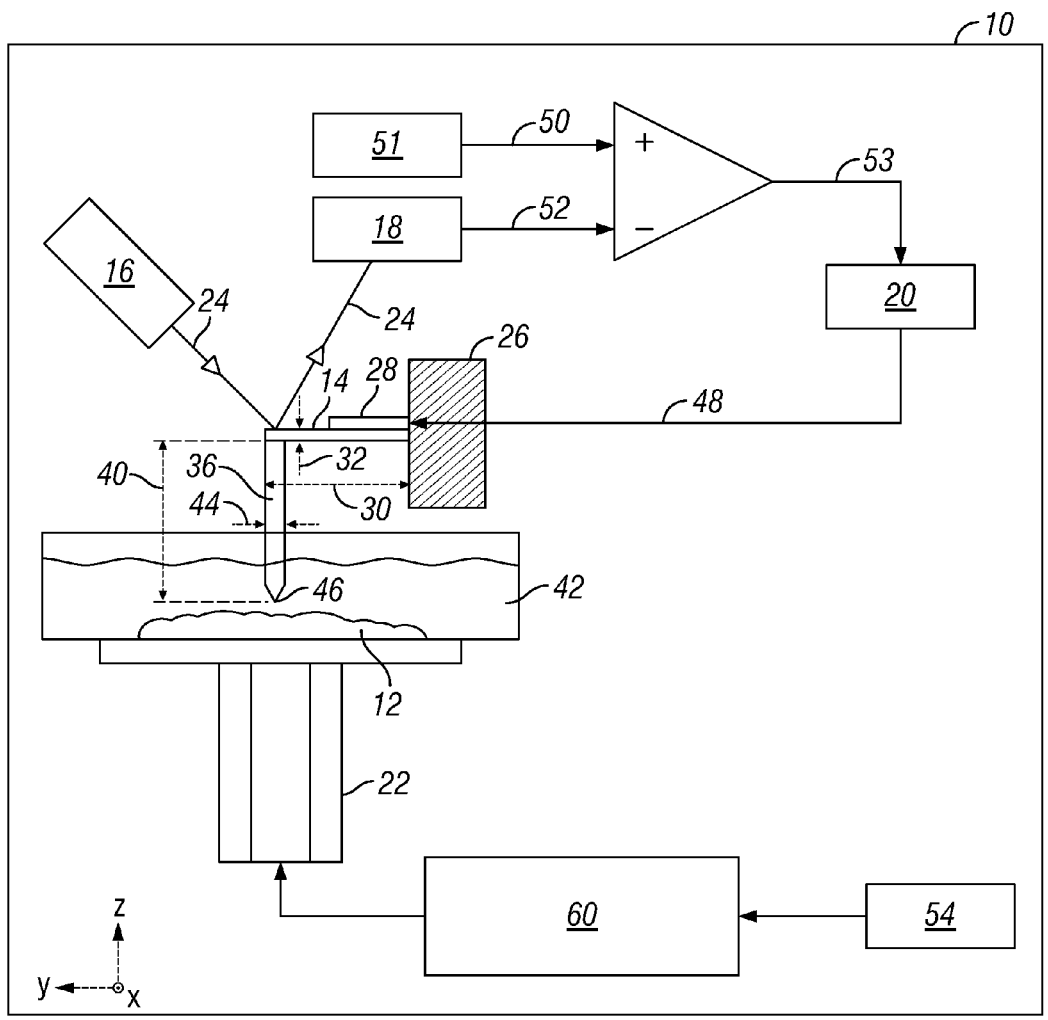
FIG. 1 illustrates a cantilever-based optical interfacial force microscope (COIFM), according to certain embodiments.

FIG. 1 illustrates a cantilever-based optical interfacial force microscope (COIFM) 10, according to certain embodiments. COIFM 10 may be configured to detect and/or measure the interfacial forces between molecules in a sample substance 12. COIFM 10 may employ an optical detection technique and a feedback loop to self-balance a cantilever 14 that senses interfacial forces in the sample substance 12. The configuration of the feedback loop and cantilever 14 may provide enhanced sensitivity of COIFM 10 to interfacial forces. In some embodiments, COIFM 10 may unveil structural and mechanical information regarding a sample substance 12 at the molecular level. COIFM 10 may comprise at least one light source 16, cantilever 14, optical detector 18, feedback controller 20, and piezotube 22.

Light source 16 may emit an optical beam 24 towards cantilever 14. Optical beam 24 from light source 16 may reflect off at least one surface of cantilever 14. Optical detector 18 may be positioned to receive optical beam 24 reflected from cantilever 14. As cantilever 14 is deflected, causing the unsupported end of cantilever 14 to move in the z-axis direction, the angle of reflection of optical beam 24 may change. Based at least in part on the angle of reflection of optical beam 24 from cantilever 14, COIFM 10 may determine the position of cantilever 14.

Light source 16 may comprise any suitable source of electromagnetic radiation. In some embodiments, light source 16 may comprise a laser such as, for example, a semiconductor laser, a solid state laser, a gas laser, a chemical laser, an excimer laser, and/or any suitable type of laser. In other embodiments, light source 16 may comprise a light-emitting diode and/or lamp emitting a low-divergence optical beam 24.

As noted above, light source 16 may emit optical beam 24 towards cantilever 14. Cantilever 14 may comprise a linear member having a fixed end attached to a support 26 and a free end that is not attached to a support. In some embodiments, cantilever 14 may project horizontally from support 26. The application of a force to the free end of cantilever 14 may cause the free end of cantilever 14 to move in the z-axis direction, resulting in deflection of cantilever 14. The application of a force to the free end of cantilever 14 may cause a torque and/or stress (e.g., shear stress, compression, and/or tension) in one or more portions of cantilever 14. In some embodiments, cantilever 14 may comprise a circuit element 28 communicatively coupled to a feedback controller 20 that prevents and/or reduces the deflection of cantilever 14.

Cantilever 14 may comprise any suitable type of structural member. In some embodiments, cantilever 14 may comprise a semiconductive material such as, for example, a doped and/or undoped silicon material. In particular embodiments, cantilever 14 may comprise phosphorus doped silicon and/or boron doped silicon. Cantilever 14 may have any suitable dimensions. In some embodiments, cantilever 14 has a length 30 from eighty (80) to one hundred and eighty (180) micrometers ($\mu$m). In particular embodiments, cantilever 14 has a length 30 from one hundred and twenty (120) to one hundred and thirty (130) $\mu$m. In some embodiments, cantilever 14 has a thickness 32 from two (2) to six (6) $\mu$m. In particular embodiments, cantilever 14 has a thickness 32 from three (3) to five (5) $\mu$m. In some embodiments, cantilever 14 has a width from forty (40) to seventy (70) $\mu$m. In particular embodiments, cantilever 14 has a width from fifty (50) to sixty (60) $\mu$m.

As noted above, cantilever 14 may comprise circuit element 28 that is communicatively coupled to feedback controller 20. In some embodiments, circuit element 28 comprises a semiconductor stack such as, for example, a zinc oxide stack. Circuit element 28 may be positioned near the fixed end (e.g., base) of cantilever 14. In conjunction with cantilever 14, circuit element 28 may act as a bimorph that controls (e.g., prevents and/or reduces) the vertical displacement of the free end of cantilever 14. Feedback controller 20 may use circuit element 28 to provide voltage activated force feedback of cantilever 14. In some embodiments, feedback controller 20 may use circuit element 28 for self-sensing of cantilever 14, for statically deflecting and/or reducing deflection of the free end of cantilever 14, and/or for oscillating and/or reducing oscillation of cantilever 14.

Cantilever 14 in COIFM 10 may be configured to measure intermolecular interactions for various sample substances. In some embodiments, cantilever 14 comprises a probe 36 affixed to the free end of cantilever 14. A sample substance may be positioned on piezotube 22 in proximity to probe 36. Intermolecular interactions between probe 36 and the sample substance 12 may exert a force on cantilever 14, causing a slight deflection of cantilever 14. Optical detector 18 may detect the deflection of cantilever 14. In response to the deflection, feedback controller 20 may adjust the voltage 48 applied to circuit element 28 in order to reduce and/or prevent further deflection of cantilever 14. Based on the voltage 48 required to prevent and/or reduce the deflection of cantilever 14, COIFM 10 may determine the interfacial forces between probe 36 and the sample substance 12. This information may be used to analyze characteristics of sample substances 12 such as, for example, interfacial adhesion, interfacial liquid structures, and/or measurements of chemical interactions.

Probe 36 of cantilever 14 may be any suitable type of probe. In some embodiments, probe 36 may be a semiconductive tip that protrudes vertically from the free end of a horizontally positioned cantilever 14. In such embodiments, probe 36 may be a pyramid-shaped tip that comprises a silicon material. The pyramid-shaped tip may resemble a spike and/or may have any suitable dimensions. For example, the pyramid-shaped tip may have a height from fifteen (15) to twenty (20) $\mu$m.

In other embodiments, probe 36 may be an optical fiber probe 36. The use of an optical fiber probe 36 may allow COIFM 10 to measure interfacial interactions in liquid environments. The optical fiber probe 36 may have a sufficient length 40 to allow the free end of the optical fiber probe 36 to penetrate a fluid 42 surrounding a sample substance 12 while cantilever 14 remains suspended above fluid 42. By keeping cantilever 14 suspended above fluid 42, COIFM 10 prevents the electrical signals of the force feedback loop from affecting the interfacial interactions between the optical fiber probe 36 and the sample substance 12. In other words, by keeping cantilever 14 and force feedback loop isolated from fluid 42, COIFM 10 may obtain accurate measurements of intermolecular interactions associated with the sample substance 12.

The optical fiber probe 36 may comprise any suitable type of optical fiber. For example, the optical fiber probe 36 may comprise a glass fiber, a plastic fiber, and/or any suitable type of optical fiber. One end of the optical fiber probe 36 may be affixed to cantilever 14 while the other end (i.e., the free end) of the optical fiber probe 36 is not affixed to any structure. The optical fiber probe 36 may be affixed to cantilever 14 using any suitable technique. For example, an end of the optical fiber probe 36 may be affixed to cantilever 14 with a thermosetting polymer such as, for example, epoxy. The optical fiber probe 36 may have any suitable dimensions. In some embodiments, the optical fiber probe 36 has a trunk diameter 44 from seventy (70) to one hundred and eighty (180) $\mu$m. In particular embodiments, the optical fiber probe 36 has a trunk diameter 44 from one hundred and twenty (120) to one hundred and thirty (130) $\mu$m. In some embodiments, the optical fiber probe 36 has a length 40 from one to two centimeters (cm). The free end of the optical fiber probe 36 may be sharpened to form a pointed end 46. In some embodiments, the pointed end 46 of the optical fiber probe 36 has a diameter from fifty (50) to one hundred and fifty (150) nanometers (nm). In particular embodiments, the pointed end 46 of the optical fiber probe 36 has a diameter from eighty (80) to one hundred and twenty (120) nm.

In some embodiments, probe 36 may comprise a wire having a sharpened tip. The tip of the wire may be sharpened according to any suitable technique such as, for example, chemical etching. Probe 36 may comprise any suitable type of wire. For example, probe 36 may comprise tungsten, titanium, chromium, and/or any suitable material.

In some embodiments, probe 36 may be coated with one or more layers of material to insulate probe 36 from liquid. A coating may be deposited over probe 36, cantilever 14, and/or both probe 36 and cantilever 14. The coating may prevent the electrical signals of the force feedback loop in COIFM 10 from affecting the interfacial interactions between probe 36 and the sample substance 12. For example, where probe 36 is a pyramid-shaped silicon tip that extends from cantilever 14, a coating on probe 36 and/or cantilever 14 may allow COIFM 10 to measure interfacial interactions in a liquid environment. To enhance the resolution and/or sensitivity of COIFM 10, the coating may not cover the apex of the tip of probe 36. The coating may comprise any suitable insulating material. For example, the coating may comprise an elastomer (e.g., silicone elastomer, polyisoprene, polyurethane, etc.), a polymer, a polyimide, and/or any suitable material.

As noted above, interfacial forces between probe 36 and the sample substance 12 may cause some deflection of cantilever 14, which may cause a change in the reflection of optical beam 24 from cantilever 14. Optical detector 18 may detect the movement of optical beam 24 reflected from cantilever 14. In some embodiments, optical detector 18 outputs to feedback controller 20 an electrical signal indicating the amount of deflection of cantilever 14. Optical detector 18 may be any suitable device that senses the presence and/or movement of optical beam 24. Optical detector 18 may comprise a transducer that converts an optical signal into an electrical signal. In some embodiments, optical detector 18 may comprise one or more laser detectors, photomultipliers, photodiodes, thermopile detectors, and/or pyroelectric energy detectors.

Feedback controller 20 may receive from optical detector 18 an electrical signal that indicates the deflection of cantilever 14. In response to the electrical signal, feedback controller 20 may adjust the voltage 48 applied to circuit element 28 on cantilever 14 in order to prevent and/or reduce the deflection of cantilever 14. The voltage 48 that is output from feedback controller 20 may be based at least in part on a voltage 50 associated with a set point 51 and a voltage 52 from optical detector 18. In some embodiments, feedback controller 20 may cause circuit element 28 to create a torque on cantilever 14 in order to achieve a zero error voltage 53.

Feedback controller 20 may comprise any suitable type of controller. For example, feedback controller 20 may be a digital controller, an analog controller, a linear gain controller, and/or a non-linear gain controller. In some embodiments, feedback controller 20 may be a proportional integral derivative (PID) controller. The voltage 48 required from feedback controller 20 to prevent and/or reduce the deflection of cantilever 14 may indicate the strength of the interfacial forces between the sample substance 12 and probe 36.

The sample substance 12 may be positioned on piezotube 22 in COIFM 10. Piezotube 22 may be coupled to a z-axis controller 54 and/or an amplifier 60, which may cause piezotube 22 to move the sample substance 12 closer to and/or further from probe 36. Thus, piezotube 22 may move the sample substance 12 in the z-axis direction. The interfacial forces measured by COIFM 10 may depend on the distance between the free end of probe 36 and the sample substance 12.

Piezotube 22 may be any suitable type of piezoelectric actuator. Piezotube 22 may comprise a ceramic and/or crystalline material that, in response to an electric field, changes in size. This property may allow piezotube 22 to position the sample substance 12 with accuracy (e.g., better than micrometer precision) in relation to probe 36 in COIFM 10. Piezotube 22 may be any suitable type of piezoelectric actuator such as, for example, a direct piezo actuator and/or an amplified piezo actuator.

COIFM 10 may be configured to measure intermolecular interactions associated with any suitable type of sample substance 12. For example, the sample substance 12 may comprise one or more biological substances such as, for example, proteins, ligands, cellular systems, and/or bacterial systems. As another example, sample substance 12 may comprise a liquid (e.g., water), which may allow COIFM 10 to measure interfacial fluid structures. As yet another example, sample substance 12 may be a solid, gaseous, and/or plasma substance.

In operation, COIFM 10 may be used to measure intermolecular interactions in a sample substance 12. The sample substance 12 may be positioned on piezotube 22 in COIFM 10. Piezotube 22 may be positioned in proximity to probe 36 suspended from the free end of cantilever 14 in COIFM 10. When COIFM 10 is activated, light source 16 may emit optical beam 24 towards cantilever 14, which may reflect optical beam 24 towards optical detector 18.

COIFM 10 may actuate piezotube 22 in the z-axis direction such that the sample substance 12 on piezotube 22 moves closer to probe 36. The interfacial forces between the molecules in the sample substance 12 and probe 36 may cause probe 36 to move closer to or further from the sample substance 12, which may cause a slight deflection of cantilever 14. The deflection of cantilever 14 may cause optical beam 24 reflected from cantilever 14 to move. The movement of optical beam 24 may be detected by optical sensor, which may, in response, transmit an electrical signal to feedback controller 20. In response to the electrical signal from optical sensor, feedback controller 20 may apply a voltage 48 to circuit element 28 affixed to cantilever 14. By applying a voltage 48 to circuit element 28, feedback controller 20 may prevent and/or reduce the deflection of cantilever 14. Based at least in part on the amount of voltage 48 required to prevent and/or reduce the deflection of cantilever 14, COIFM 10 may determine and/or indicate the strength of the interfacial forces in the sample substance 12.

Figure 2A:
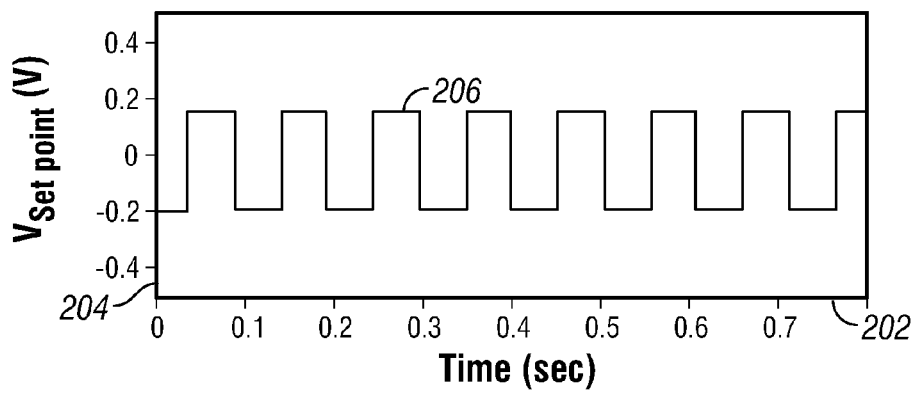
FIGS. 2A to 2D are graphs that illustrate the relationships of example electrical signals in a COIFM, according to certain embodiments.
Figure 2B:
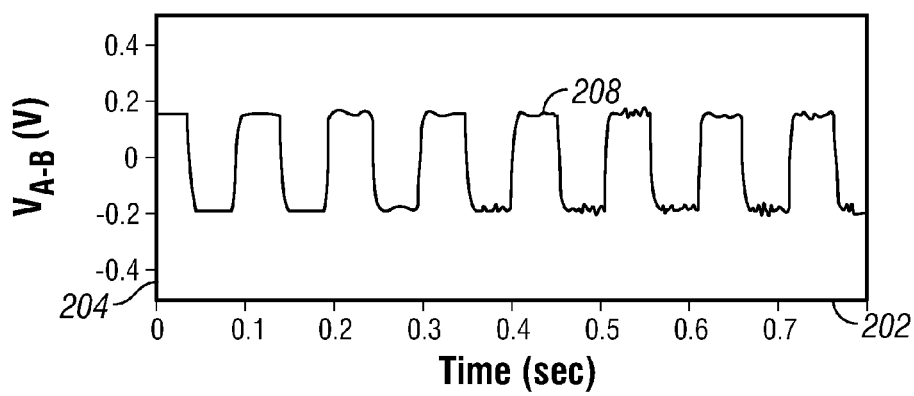
Figure 2C:
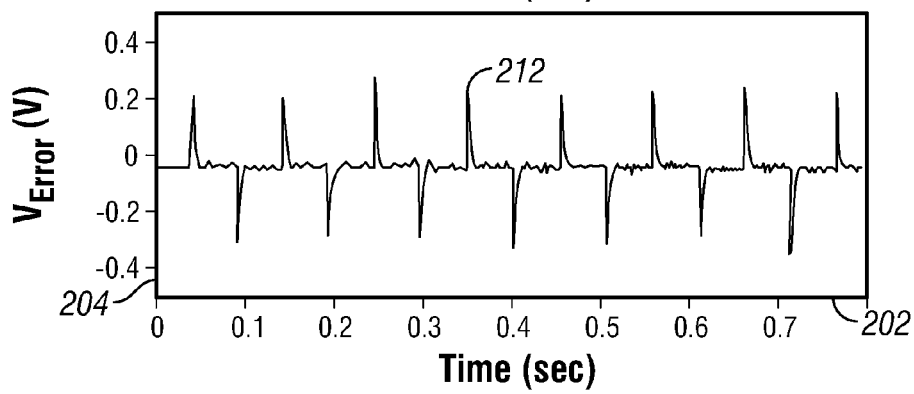
Figure 2D:
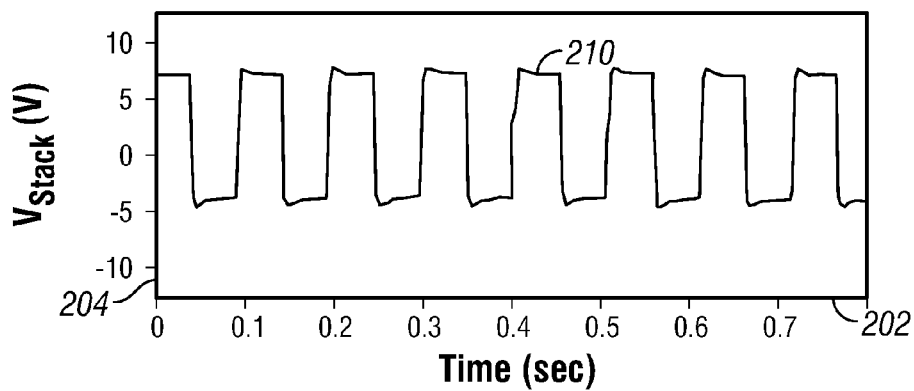

FIGS. 2A to 2D are graphs that illustrate the relationship of example electrical signals in COIFM 10, according to certain embodiments. The x-axis 202 of each graph represents time and the y-axis 204 of each graph represents a respective voltage in the feedback loop in COIFM 10. Electrical signals in COIFM 10 may be adjusted to determine the time resolution of COIFM 10. For example, as illustrated in FIG. 2A, when the sample substance 12 is not in proximity to probe 36, COIFM 10 may apply a square wave voltage with a particular amplitude (e.g., 0.2 V) and frequency (e.g., 10 Hz) to the set-point voltage ($V_{set\,point}$) 206. As illustrated in FIG. 2B, feedback controller 20 may be operable to configure the preamp output ($V_{A-B}$) 208 to follow the square wave by applying appropriate voltages ($V_{stack}$) 210 to circuit element 28 affixed to cantilever 14. The square wave may cause circuit element 28 to create a torque on cantilever 14 in order to achieve a zero error voltage ($V_{error}$) 212, as illustrated in FIG. 2C. Thus, feedback controller 20 may be configured to optimize the transient response to achieve the appropriate time response for COIFM 10. As illustrated in FIG. 2D, COIFM 10 may, in some embodiments, have a practical time resolution that is between one and two milliseconds (ms).

Although particular voltage levels and time resolutions are described above, it should be understood that COIFM 10 may be configured to operate with any suitable voltage levels and time resolutions.

Figure 3A:
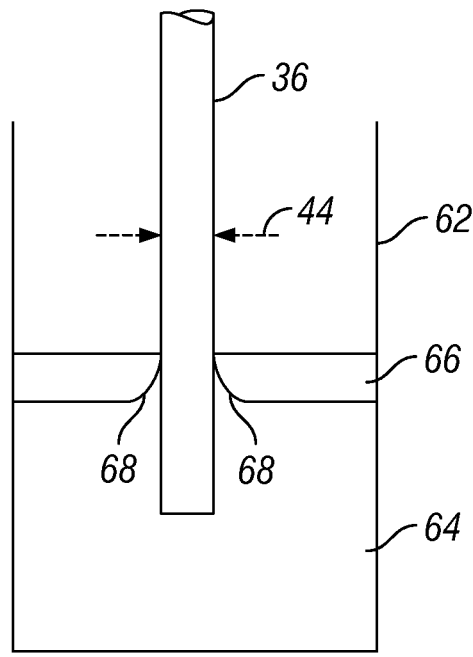
FIGS. 3A and 3B illustrate the formation of an optical fiber probe for a COIFM, according to certain embodiments.
Figure 3B:
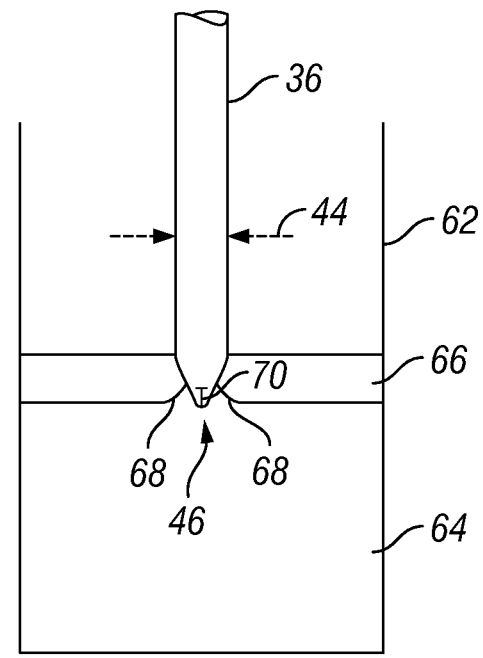

FIGS. 3A and 3B illustrate the formation of an optical fiber probe 36 for COIFM 10, according to certain embodiments. In some embodiments, a pointed end 46 may be formed on the optical fiber probe 36 by an acid etching technique.

As noted above, an optical fiber probe 36 may comprise any suitable type of optical fiber. In some embodiments, the optical fiber used to form the optical fiber probe 36 may be uncoated. In other embodiment, a coated optical fiber may be selected, and the coating may then be stripped from at least a portion of the optical fiber. The coating of the optical fiber may be removed by any suitable technique such as, for example, by using a wire stripping device.

The optical fiber may have any suitable trunk diameter 44. In some embodiments, the trunk diameter 44 of the uncoated optical fiber may be from seventy (70) to one hundred and eighty (180) µm. In particular embodiments, the trunk diameter 44 may be from one hundred and twenty (120) to one hundred and thirty (130) µm.

To form a pointed end 46 on the optical fiber probe 36, an uncoated optical fiber may be positioned vertically in a container 62. Container 62 may be any suitable type of container such as, for example, an acid resistant beaker. Once the optical fiber probe 36 is positioned in container 62, an acid 64 may be added to container 62. A sufficient quantity of acid 64 may be added such that acid 64 immerses the free end of the optical fiber probe 36. Acid 64 may be any suitable type of acid 64 such as, for example, a monoprotic acid and/or a polyprotic acid. In some embodiments, acid 64 may be a mineral acid, a sulfonic acid, and/or a carboxylic acid. In particular embodiments, acid 64 may be a hydrofluoric acid and/or a hydrochloric acid.

After acid 64 is added to container 62, a solvent 66 may be added to container 62. Solvent 66 may be less dense and/or immiscible in acid 64. Consequently, solvent 66 may form a separate layer of fluid over acid 64. The layer of solvent 66 may serve as a protective barrier to the optical fiber probe 36 so that only a controlled portion of the optical fiber probe 36 is dissolved and/or sharpened by acid 64.

Solvent 66 may be any suitable type of solvent 66 that is less dense than acid 64 and/or immiscible in acid 64. For example, solvent 66 may be an aromatic hydrocarbon such as, for example, toluene and/or benzene. As another example, solvent 66 may be hexane and/or cyclohexane.

In some embodiments, acid 64 in container 62 may form a meniscus 68 on the optical fiber probe 36. Meniscus 68 may recede as acid 64 dissolves the material (e.g., glass) in the optical fiber. Due to the formation of meniscus 68, more material (e.g., glass) may be dissolved at the immersed (e.g., distal) end of the optical fiber, which may result in the continuous narrowing of the optical fiber to create a pointed end 46. The pointed end 46 of the optical fiber may have any suitable diameter 70. In some embodiments, the diameter 70 of the pointed end 46 may be from fifty (50) to one hundred and fifty (150) nm.

The optical fiber probe 36 may be left in container 62 for any suitable period of time (e.g., sixty minutes, ninety minutes, etc.) to form the pointed end 46. Once the pointed end 46 is formed, the optical fiber probe 36 may be removed from container 62 and cleaned. In some embodiments, the pointed end 46 of the optical fiber probe 36 may be polished and/or annealed. Annealing may align the molecules in the pointed end 46 of the optical fiber probe 36 to enhance the accuracy of measurements by COIFM 10.

Although an acid etching technique is described above, it should be understood that any suitable technique may be used to form the pointed end 46 on the optical fiber probe 36. For example, the pointed end 46 on the optical fiber probe 36 may be formed by milling, dry etching, vapor etching, and/or any suitable technique. In some embodiments, the pointed end 46 may be formed on the optical fiber probe 36 by thermal heating of the optical fiber with a laser (e.g., a carbon dioxide laser). In other embodiments, the pointed end 46 may be formed on the optical fiber probe 36 by resistive heating.

In some embodiments, COIFM 10 may be used to analyze interfacial liquid structures in an ambient environment. To analyze interfacial liquid structures, COIFM 10 may measure the normal force and/or the friction force between probe 36 in COIFM 10 and the sample substance 12. Measuring the normal force may permit COIFM 10 to monitor the adhesion between probe 36 and the sample substance 12. Measuring the friction force may allow COIFM 10 to monitor the ordering of molecules in the sample substance 12. In some embodiments, the friction force may be measured by laterally modulating the sample substance 12 as it is brought into proximity with probe 36.

Figure 4:
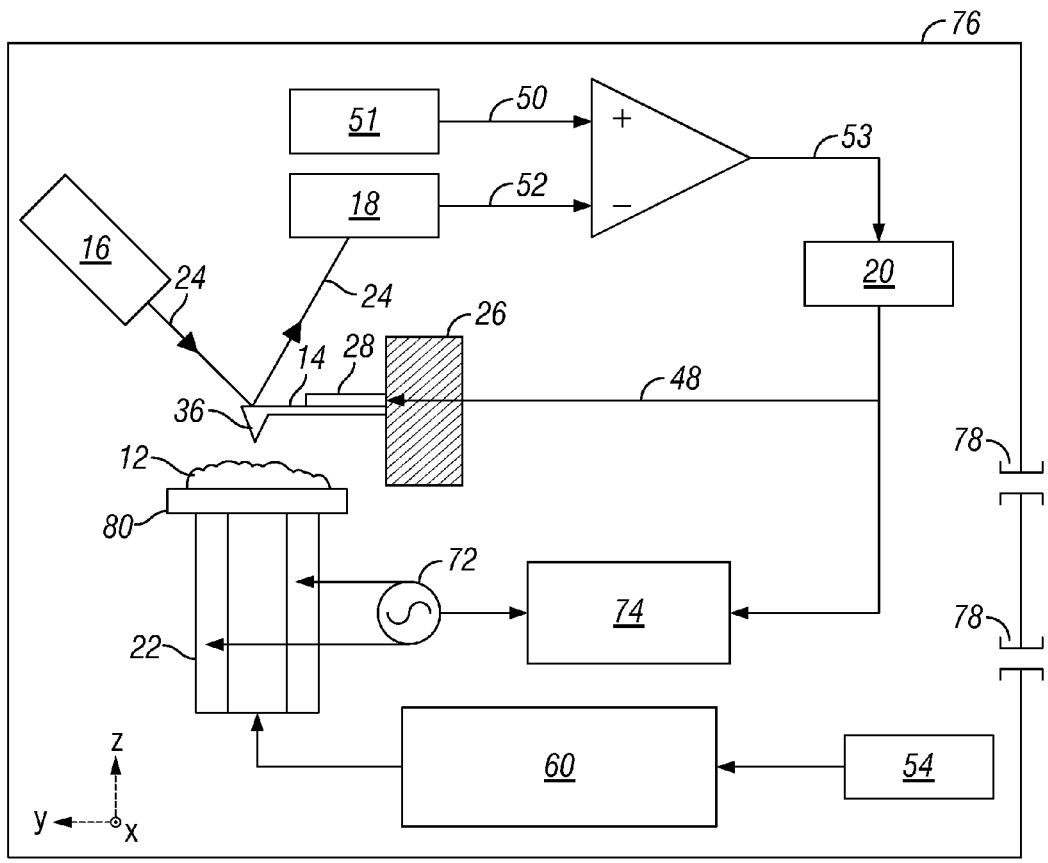
FIG. 4 illustrates a COIFM configured to analyze interfacial liquid structures by laterally modulating a sample substance, according to certain embodiments.

FIG. 4 illustrates COIFM 10 configured to analyze interfacial liquid structures by laterally modulating the sample substance 12, according to certain embodiments. COIFM 10 may comprise light source 16, cantilever 14, optical detector 18, feedback controller 20, and piezotube 22, as described above with respect to FIG. 1. COIFM 10 may further comprise a lateral modulator 72 and lock-in amplifier 74 communicatively coupled to piezotube 22 and feedback controller 20.

Lateral modulator 72 may be operable to modulate piezotube 22 in the x-axis and/or y-axis directions (also called lateral modulation). Lateral modulator 72 may comprise a voltage supply that is configured to actuate the modulation of piezotube 22. Lateral modulator 72 may be any suitable modulator such as, for example, a piezoelectric actuator. For example, piezotube 22 may comprise a ceramic structure that contracts and/or expands in the x-axis and/or y-axis directions in response to a voltage applied by the voltage supply in lateral modulator 72.

Lateral modulator 72 may be communicatively coupled to lock-in amplifier 74. Lock-in amplifier 74 may be operable to detect and/or measure the lateral modulation of piezotube 22. Lock-in amplifier 74, which may act as a homodyne with a low pass filter, may be operable to extract a signal with a known carrier wave from a noisy environment. Lock-in amplifier 74 may be operable to convert the phase (and/or related information such as in-phase and quadrature components) and amplitude of the extracted signal into a time-varying, low-frequency voltage signal. In some embodiments, lock-in amplifier 74 may be configured to measure phase shift associated with the extracted signal.

In operation, COIFM 10 may laterally modulate the sample substance 12 to gather information regarding interfacial liquid structures in the sample substance 12. In some embodiments, a sample substance 12 (e.g., a fluid) may be deposited on piezotube 22. COIFM 10 may then establish a feedback loop between optical detector 18 and circuit element 28 on cantilever 14. Piezotube 22 may then be actuated in the z-axis direction (i.e., vertically) such that the sample substance 12 is brought near to and/or in contact with the free end of probe 36 in COIFM 10. As the sample substance 12 is brought into proximity with probe 36, adhesion forces between the sample substance 12 and probe 36 may cause cantilever 14 to deflect. Optical detector 18 may detect the deflection of cantilever 14. Based on signals from optical detector 18 and feedback controller 20, COIFM 10 may measure the adhesions forces between the sample substance 12 and probe 36.

For example, and as discussed above, the feedback loop may receive an electrical signal 53 related to the deflection of the cantilever 14, and the electrical signal 53 may comprise a normal force component and a friction force component. In one embodiment, the normal force component may comprise a DC component of the electrical signal 53, and the friction force component may comprise an AC component of the electrical signal 53. The normal force component may be measured at the feedback controller 20, while the friction force component may be measured at the lock-in amplifier 74. In some cases, the normal and friction force components may be measured concurrently. For instance, z-axis controller 54 and amplifier 60 may engender movement of piezotube 22 in the z- or vertical axis, while lock-in amplifier 74 and lateral modulator 72 may engender lateral modulation of piezotube 22. In response to the vertical and lateral modulation of the piezotube 22, and as a result of molecular force acting between a sample 12 placed on the piezotube 22 and probe 36 of the cantilever 14, the cantilever 14 may deflect. As cantilever 14 deflects, optical detector 18 may detect the deflection of the cantilever 14 and convert the deflection into an electrical signal 52. The electrical signal 52 may be compared with an electrical signal 50 from a set point 51 to yield an electrical signal 53. Feedback controller 20 may be configured to receive the electrical signal 53 and, as described above, induce circuit element 28 to counteract the deflection of cantilever 14. Also as discussed above, feedback controller 20 may be coupled to lock-in amplifier 74.

In one embodiment, the feedback controller 20 may be configured to measure a DC component of the electrical signal 53. In some cases, the DC component may be converted, using a conversion factor, to lead to a normal force value. Also, the lock-in amplifier 74 may be configured to measure an AC component of the electrical signal 53. Lock-in amplifier 74 may measure amplitude and/or phase of the AC component or related information (e.g in-phase and quadrature components) at a driving frequency of the lateral modulator 72. In some cases, the AC component may be converted, using a conversion factor, to lead to a friction force value. The relationship of normal force and friction force may be represented by the equation:

$$V_{stack} = \frac{3\alpha}{2\beta k_z L_{cant}} \left( F_z + \frac{2L_{tip}}{L_{cant}} F_x \right)$$

In the foregoing equation, $V_{stack}$ may represent the applied voltage 48 to circuit element 28, $\alpha$ may represent a proportional constant, $k_z$ may represent a spring constant, $L_{cant}$ may represent the length of cantilever 14, $L_{tip}$ may represent the probe length, and $F_z$ and $F_x$ may represent the normal and friction forces, respectively. Therefore, the normal force conversion factor may be $2\beta k_z L_{cant}/3\alpha$, and the friction force conversion factor may be $\beta k_z L_{cant}^2/3\alpha L_{tip}$. The derivation and sample calculations of the above equations can be found in the paper: Byung I. Kim et al., *Simultaneous Measurement of Normal and Friction Forces Using a Cantilever-Based Optical Interfacial Force Microscope*, REVIEW OF SCIENTIFIC INSTRUMENTS 82, 05311 (2011), which is hereby incorporated by reference in its entirety.

By way of example, if the probe is made of 1-10 $\Omega$cm phosphorus doped Si, with a nominal spring constant ($k_z$) and resonance frequency known to be 3N/m and 50 kHz, respectively, and if the cantilever and probe dimensions are measured to be $L_{cant}$=485 µm and $L_{tip}$=20 µm, respectively. Then, measurements may be taken in ambient conditions with relative humidity of 55%. Tip speed may be chosen to be 10 nm/s, and lateral movement achieved by modulating the sample along the long axis direction of the cantilever with a 1 nm amplitude and a frequency of 100 Hz. Based on these numbers, the amplitude of the AC component may be measured at the lock-in amplifier 74 and the DC component at the feedback controller 20. Based on this information, and using the conversion factors disclosed above, the normal force conversion factor may be calculated to be approximately 5 nN/V and the frictional force conversion factor may be calculated to be approximately 60 nN/V. Of course, one of ordinary skill in the art would recognize that based on any multitude of variables, each respective conversion factor could change significantly.

Additionally, a memory element (not shown) may be coupled to the feedback controller 20 and/or the lock-in amplifier 74 in order to record values measured by each respective element. The measured values may be recorded as a function of distance, wherein the distance is related to the movement of piezotube 22 by the z-axis controller 54 and/or the amplifier 60. In some embodiments, the memory element may be coupled internally to the feedback loop. In other cases, the memory element may be external to the microscope and coupled to the feedback loop through any type of wired or wireless connection, as appropriate.

Figure 5:
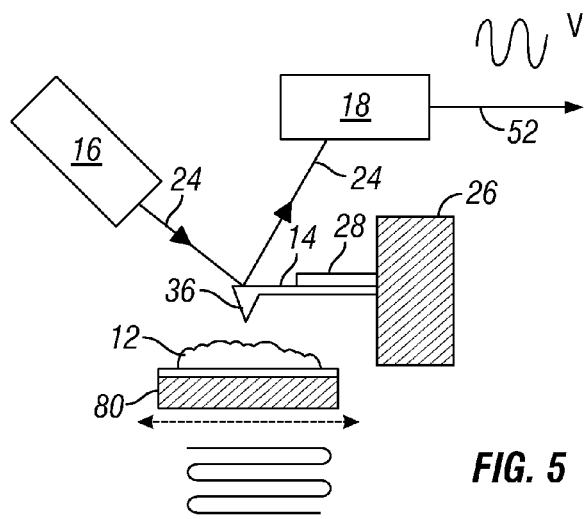
FIG. 5 illustrates the lateral modulation of a tray in a COIFM, according to certain embodiments.

As illustrated in FIG. 5, piezotube 22 may be modulated laterally (e.g., in the x-axis and/or y-axis directions) as piezotube 22 moves the sample substance 12 into contact with probe 36. As the sample substance 12 approaches and retracts from probe 36, lock-in amplifier 74 may detect a voltage signal that indicates the effect of friction forces between the sample substance 12 and probe 36. In some embodiments, COIFM 10 may indicate and/or record information regarding the normal forces, friction forces, and/or the distance between probe 36 and the sample substance 12.

An example illustrates certain embodiments of COIFM 10. In some embodiments, COIFM 10 may measure the effect of interfacial water in micro-electro-mechanical system (MEMS) devices. In such devices, the presence of water may hinder the movement and/or function of micro-electro-mechanical structures. Understanding the effects of interfacial water in MEMS devices may enable designing MEMS devices that effectively operate in humid and/or wet environments.

In the present example, water may be deposited on a tray 80 (e.g., silicon substrate) on piezotube 22 in an ambient environment, as illustrated in FIG. 4. COIFM 10 may be equipped with probe 36 that comprises a silicon tip. COIFM 10 may be placed in an enclosure 76 (e.g., an acryl box) having at least one inlet port 78 for dry nitrogen gas and at least one inlet port 78 for humid water vapor. Appropriate levels of nitrogen gas and water vapor may then be added to enclosure 76 to control the amount of humidity.

In the present example, COIFM 10 may establish a feedback loop between optical detector 18 and circuit element 28 on cantilever 14. Lateral modulator 72 may modulate piezotube 22 in the x-axis and/or y-axis directions as piezotube 22 moves in the z-axis direction to bring the water into contact with probe 36. COIFM 10 may measure both the normal forces and the friction forces between the water and probe 36. COIFM 10 may collect and/or record data as piezotube 22, while modulating, approaches and retracts from probe 36.

In the present example, chains of water molecules may form between probe 36 and tray 80 on piezotube 22. When tray 80 on piezotube 22 is in proximity to the silicon tip of probe 36, the normal forces and friction forces caused by the water chains may oscillate. As the gap distance decreases between probe 36 and tray 80, the force response of the water chains may resemble the force response of a polymer (as opposed to the force response of a spring).

In some embodiments, the water molecules confined between probe 36 and tray 80 on piezotube 22 may form a bundle of water chains through hydrogen bonding. The length of each chain may be approximated by a model called "freely jointed chain" (FJC), in which the individual segments of each water chain move randomly. The FJC model may be expressed by the following equation:

$$\langle z_l \rangle = l \cdot \sigma \left[ \coth\left(\frac{f_l}{n} \cdot \frac{\sigma}{k_B T}\right) - \left(\frac{n}{f_l} \cdot \frac{k_B T}{\sigma}\right) \right]$$

In the foregoing equation, l may represent the number of water joints, $\sigma$ may represent the diameter of water, f may represent tip force, n may represent the number of water chains, $k_B$ may represent the Boltzmann constant, and T may represent temperature. Applying the FJC model in the present example, the measurements by COIFM 10 may indicate that, as probe 36 approaches tray 80 on piezotube 22, the number of water chains between probe 36 and silicon substrate may increase while the number of water joints in each chain may decrease.

Although the foregoing example describes the use of COIFM 10 to measure interfacial forces associated with water chains, it should be understood that COIFM 10 may be used to measure interfacial forces in any suitable substance.

Figure 6:
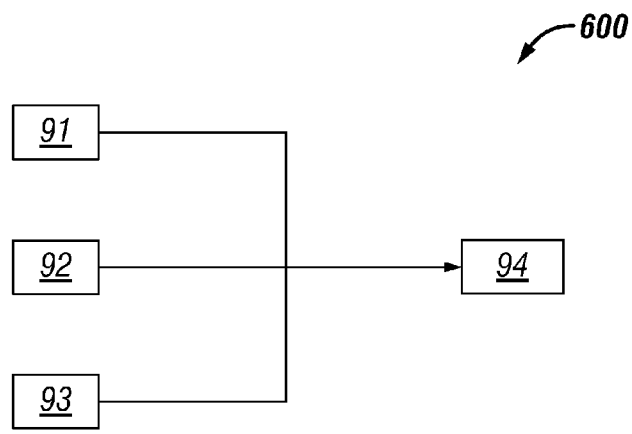
FIG. 6 illustrates a system for high-speed atomic force microscopy.
Figure 7:
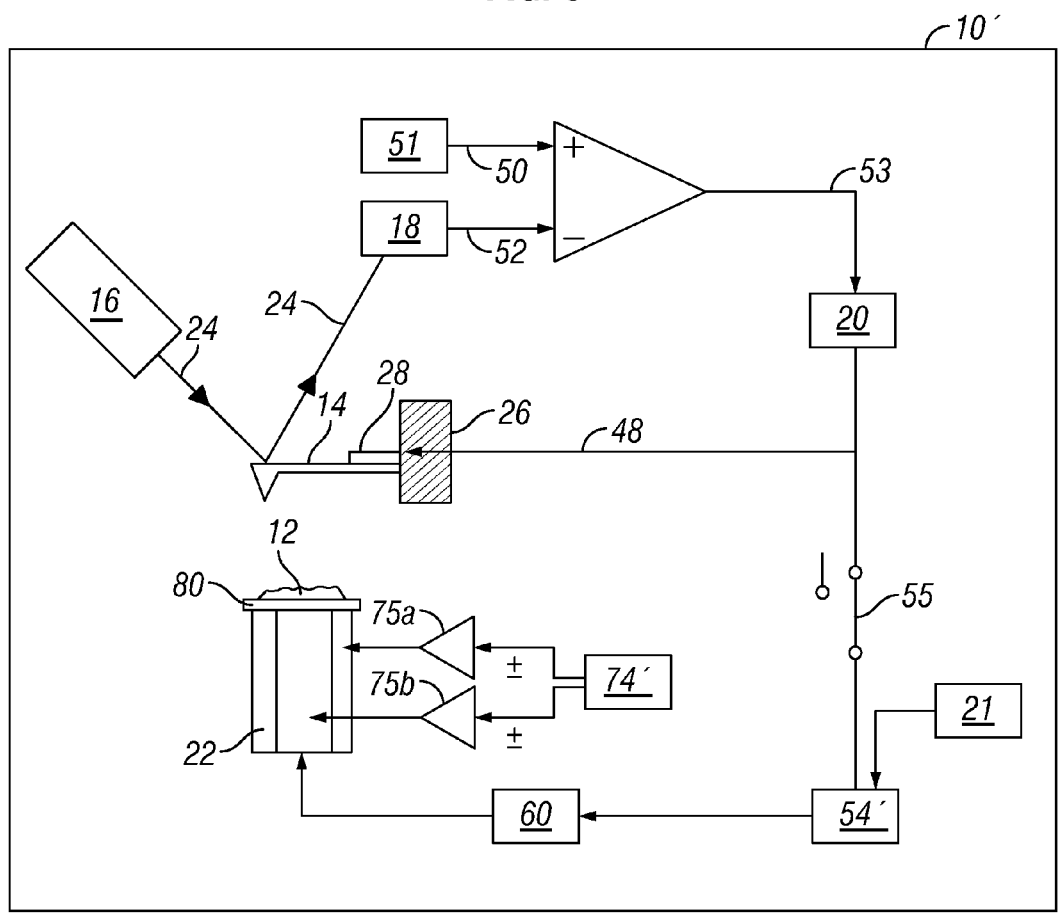
FIG. 7 illustrates a high-speed atomic force microscope.

FIGS. 6-10 illustrate examples of the present disclosure relating to a high-speed atomic force microscope (HSAFM), as opposed to the COIFM example discussed above. Briefly, an HSAFM example may differ from a COIFM example in terms of structure and operation, among other things. For example, as will be discussed below in relation to FIGS. 7, 8A, and 8B, an HSAFM embodiment may comprise two feedback loops (see FIG. 7) compared to the single feedback setup illustrated in the COIFM embodiment illustrated in FIG. 4. Additionally, an HSAFM embodiment may modulate and/or otherwise move piezotube 22 over greater distances and/or at higher speeds than the COIFM embodiment illustrated in FIG. 4. Thus, an HSAFM embodiment may comprise a high voltage scanner 74', as illustrated in FIG. 7, connected to high voltage amplifiers in order to facilitate the scanning of a sample 12.

FIG. 6 illustrates a system 600 for high-speed atomic force microscopy according to the present disclosure. In one example, the system 600 comprises a first image 91, a second image 92, a third image 93, and a composite image 94. In this example, the first image 91 may comprise a deflection image, the second image 92 may comprise a topographic image, and the third image 93 may comprise a force image. The first, second, and third images 91, 92, and 93, respectively may be combined to form a composite image 94. In one example, the first image 91 may comprise a deflection image related to the deflection of cantilever 14. The second image 92 may comprise a topographic image related to a topographic scan of a sample 12. The third image 93 may comprise a force image related to a force feedback measurement at circuit element 28.

In use, system 600 for high-speed atomic force microscopy may take three concurrent measurements and/or readings of a sample 12 correlate the measurements/readings into images. The resulting images, first image 91, second image 92, and third image 93 may be combined or otherwise correlated to lead to a composite image 94.

FIG. 7 illustrates a high-speed atomic force microscope 10' comprising a cantilever 14 having a probe 36, the cantilever 14 abutting a support 26 and a circuit element 28. A sample 12 is arranged in proximity to probe 36 on a tray 80 and a piezotube 22. A light source 16 is configured to emit a light beam 24 to reflect off of cantilever 14 and be detected by an optical detector 18. The output of optical detector 18, a voltage 52, and the output of a voltage setpoint 51, a voltage 50, are fed into the input of a feedback loop leading to a zero error voltage 53, which may run into a first feedback controller 20 and back into circuit element 28. The first feedback controller 20 may also be connected to a switch 55 configured to switch between two feedback loops. The switch 55 may connect to a second feedback controller 54'. A force setpoint 21 may also feed into the second feedback controller 54'. The output of second feedback controller 54' may feed into a high voltage amplifier 60, and in turn into piezotube 22 in order to control the modulation of piezotube 22 along the Z-axis. A high voltage scanner 74' is connected via high voltage amplifiers 75a and 75b into piezotube 22 in order to control the modulation of piezotube 22 along the X- and Y-axes. In one example, cantilever 14 may comprise a nominal width of approximately 55 μm and a nominal length of approximately 125 μm. Of course, other example cantilevers, such as cantilever 14, may have different lengths and widths, including, for example, a width greater than approximately 10 μm and a length greater than approximately 30 μm.

Switch 55 may be any appropriate switching mechanism such as a manual on-off switch or a toggle switch among other things. A force setpoint 21 may be sent to second feedback controller 54' in order to control the modulation of piezotube 22 along the Z-axis. For instance, in one example, the modulation of piezotube 22 along the Z-axis may be restrained to approximately 1.5 μm by a suitable force setpoint 21. Second feedback controller 54' may be any suitable feedback controller, such as a PID feedback controller or a DSP controller.

Figure 8A:
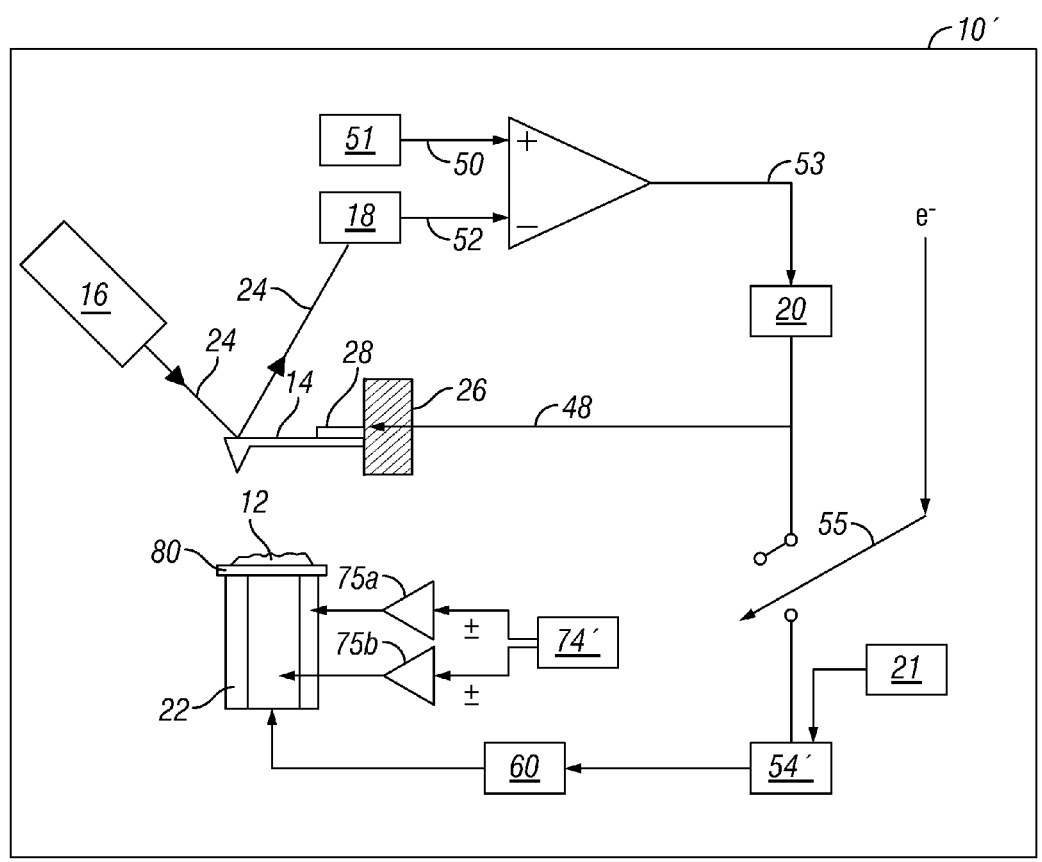
FIGS. 8A and 8B illustrate a high-speed atomic force microscope using a first and a second feedback loop.
Figure 8B:
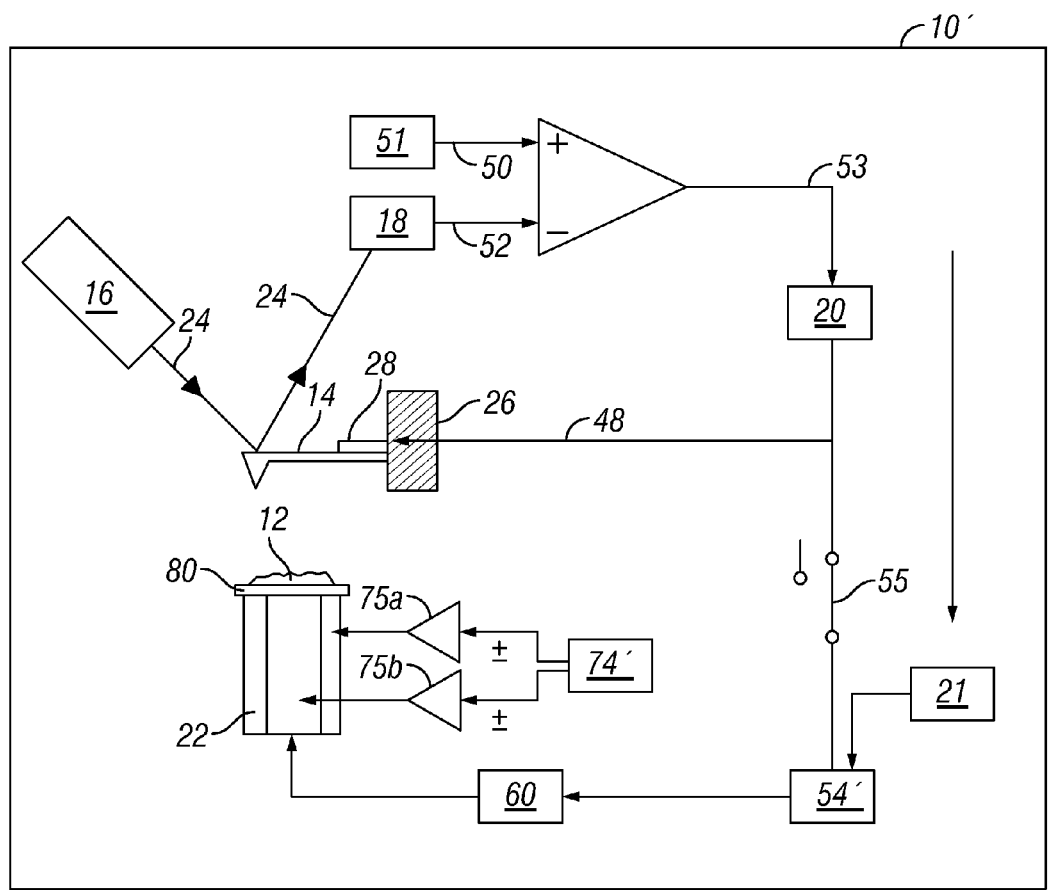

FIGS. 8A and 8B illustrate the high-speed atomic force microscope 10' of FIG. 7 with switch 55 both off and on. As shown in FIG. 8A, when the switch 55 is in the off position, the feedback loop resembles that of the COIFM embodiment of FIG. 1. FIG. 8B illustrates that when the switch 55 is in the on position, the feedback loop runs through the second feedback controller 54'. Another difference between the high-speed atomic force microscope 10' of FIG. 7 and COIFM 10 of FIG. 1 is that while lock-in amplifier 74 of COIFM 10 emitted a sinusoidal signal, high voltage scanner 74' emits a triangular wave (comprising a ramp up and a ramp down).

In use, a sample 12 is placed in proximity to probe 36, causing deflection of cantilever 14, and a deflection measurement is made at optical detector 18. Concurrently, the reading at optical detector 18 is fed into the feedback system and to circuit element 28 in order to counteract the deflection of cantilever 14. The signal at circuit element 28 comprises a force measurement. Also concurrently, via switch 55, a signal related to the topographic image of sample 12 is read at the second feedback controller 54'. The deflection, force, and topographic signals may be correlated into a composite image 94.

As one of ordinary skill in the art would appreciate, high-speed atomic force microscope 10' may confer advantages not readily available in traditional high-speed atomic force microscopy devices. For instance, the use of circuit element 28 in conjunction with cantilever 14 may allow cantilevers of typical AFM devices to be used to perform high-speed AFM scanning without utilizing a smaller cantilever. Indeed, the circuit element 28 communicably connected to optical detector 18 through a feedback loop may effectively reduce cantilever deflection to negligible levels. Of course, these are but a few examples of the many advantages of high-speed atomic force microscope 10' according to the present disclosure. Additional examples are discussed in B. I. Kim and R. D. Boehm, *Force-Feedback High-Speed Atomic Force Microscope for Studying Large Biological Systems*, MICRON 43, 1372-79 (2012), which is hereby incorporated by reference.

Figure 9A:
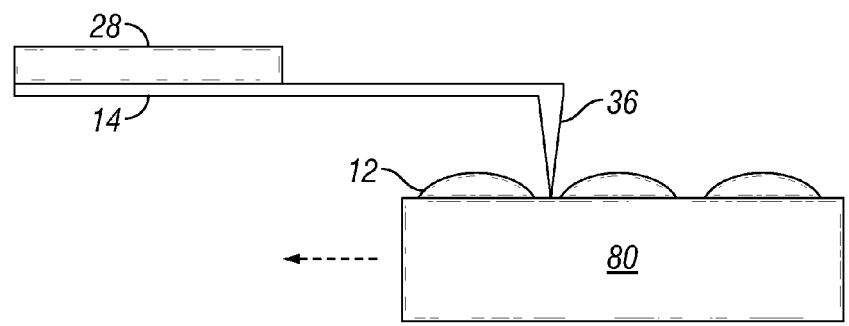
FIGS. 9A to 9D illustrate a plurality of steps for scanning a sample according to the present disclosure.

FIGS. 9A to 9D illustrate a method of arriving at a composite image 94 of a sample 12 according to one example. FIG. 9A illustrates a sample 12 being placed in proximity to a cantilever 14 having a probe 36 and a circuit element 28. In this example, the sample 12 is moved as indicated by the block arrow pointing away from tray 80. As was discussed above, the modulation of sample 12 along the X- and Y-axes may be controlled by a high voltage scanner 74'. At the point of time illustrated in FIG. 9A, cantilever 14 is not deflected, circuit element 28 is not exerting a force on cantilever 14, and the signal measured at the second feedback controller 54' may indicate a trough between ridges of a sample.

Figure 9B:
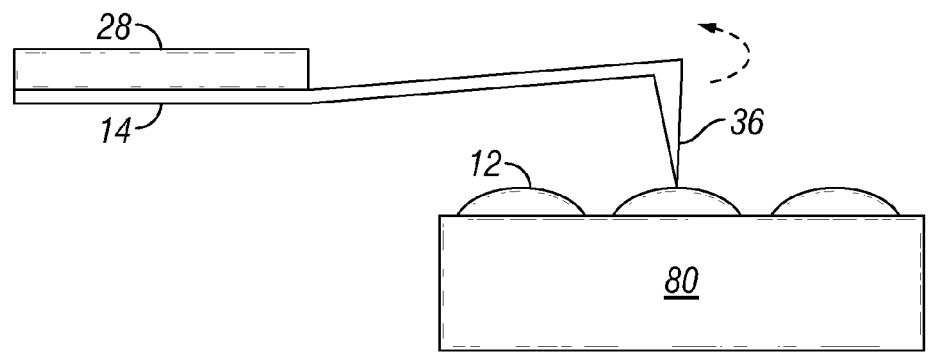
Figure 9C:
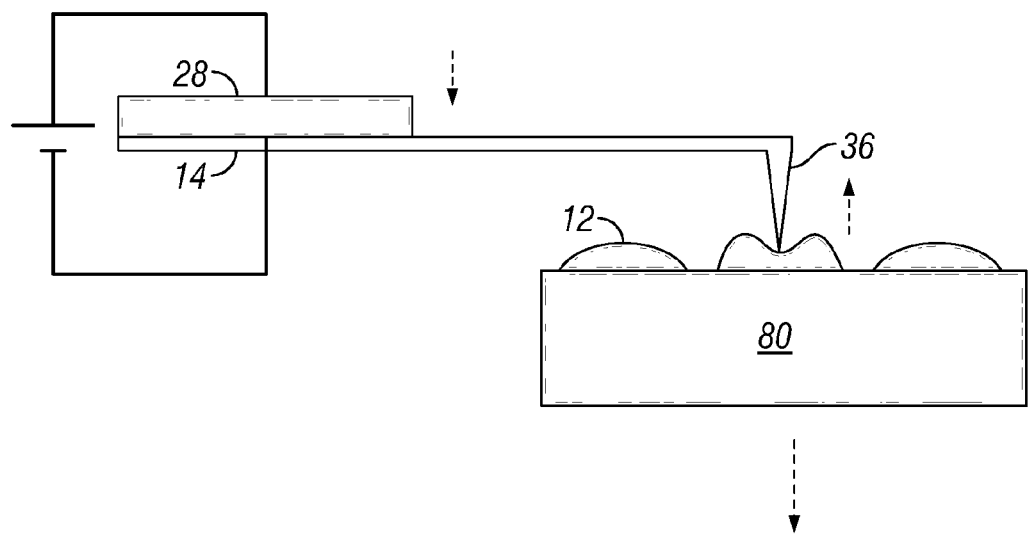
Figure 9D:
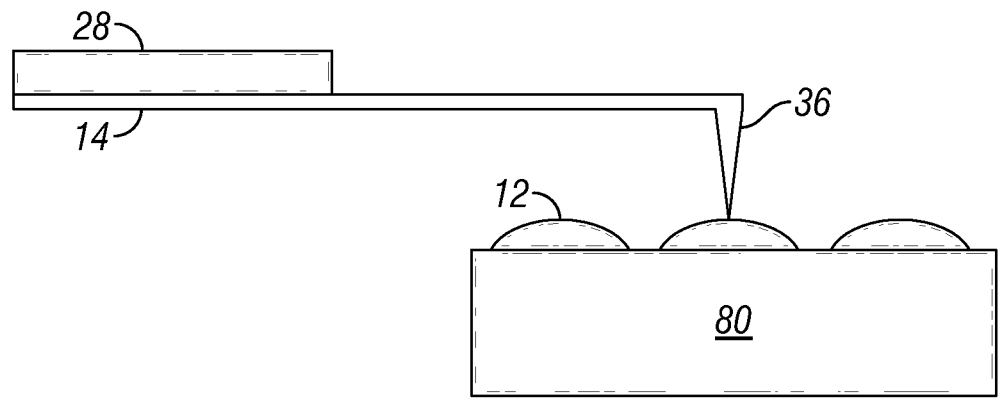
Figure 10:
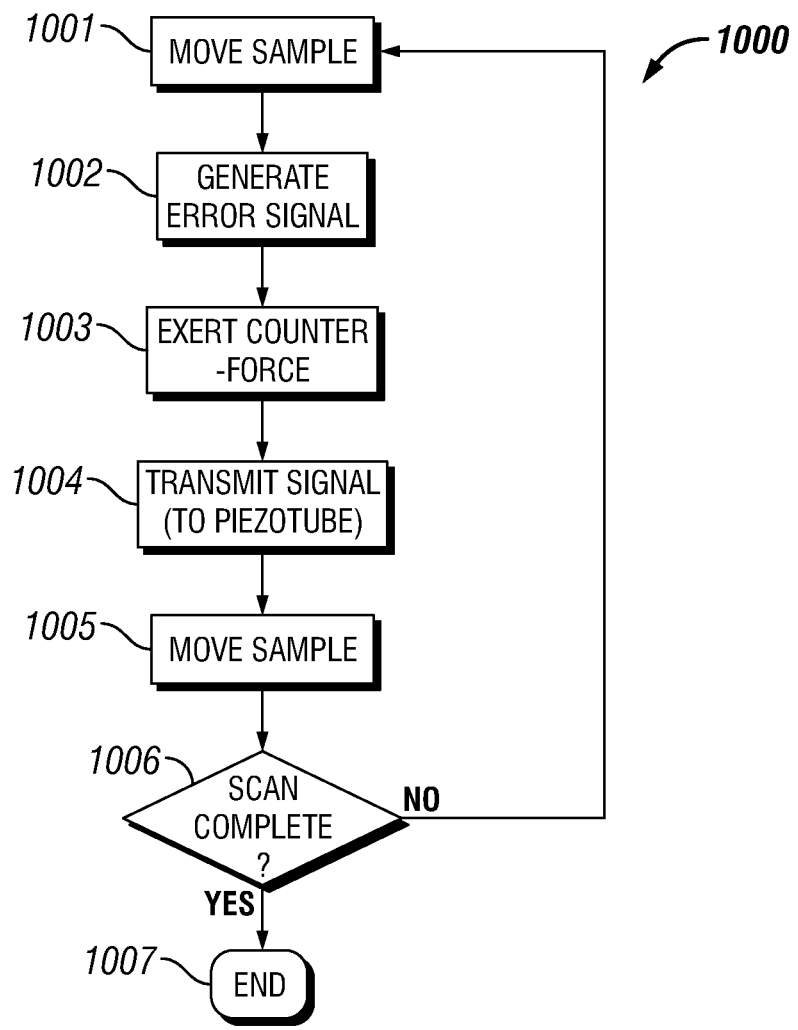
FIG. 10 illustrates a method of scanning a sample according to the present disclosure.

However, as is illustrated in FIG. 9B, as the sample 12 is moved with respect to probe 36, the repulsive forces of sample 12 overcome the attractive forces and cantilever 14 deflects, as illustrated by the curved block arrow at the end of cantilever 14. In response to the deflection of cantilever 14, circuit element 28 may apply a force to cantilever 14, as illustrated in FIG. 9C. In response to the force applied by circuit element 28, probe 36 will exert a force onto sample 12 and tray 80 will travel away from probe 36 along the Z-axis, as shown by the block arrow under tray 80. After the modulation of sample 12 along the Z-axis, the cantilever 14, circuit element, and all of the corresponding forces will return to an equilibrium state.

In one example, the measured forces at cantilever 14, circuit element 28, and second feedback controller 54' may be combined to form a composite image comprising a deflection image, a force image, and a topographic image. While typical AFM devices typically only provide a deflection image and a topographic image, the present disclosure proposes a high-speed atomic force microscope 10' capable of arriving at a composite image comprising a deflection image, a force image, and a topographic image. Additionally, the presence of circuit element 28 allows the use of a cantilever 14 of a typical size.

FIG. 1000 illustrates a method 1000 of scanning a sample 12 with a high-speed atomic force microscope 10' according to the present disclosure. In a first method step 1001, a sample 12 is moved relative to a probe 36. The movement of sample 12 will lead to a deflection signal based on the deflection of cantilever 14. The deflection signal may be used to arrive at a deflection image. In a second method step 1002, an error signal 53 is generated and circuit element 28 counteracts the deflection of cantilever 14 in a third method step 1003, leading to a force signal. The force signal may be used to arrive at a force image.

In a fourth method step 1004, in response to the force exerted by circuit element 28, a signal may be transmitted to piezotube 22. In response to the signal transmitted to piezotube 22, the sample 12 may be moved along the Z-axis, relative to probe 36 in a fifth method step 1005.

In a next step 1006, the high-speed atomic force microscope 10' will determine whether the scan of the sample 12 has been completed. If not, the method steps will be repeated. If it is determined that the scan of sample 12 has been completed, then the routine will end in a step 1007. The signals measured or detected corresponding to a deflection, a force, and a topographic image may be combined or otherwise correlated in order to yield a composite image 94.

The present disclosure encompasses all changes, substitutions, variations, alterations and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A high-speed atomic force microscope comprising:
   a cantilever having a probe;
   a piezotube arranged in proximity to the probe;
   an optical detector configured to detect deflection of the cantilever;
   a circuit element abutting a first end of the cantilever and configured to exert a force on the cantilever to resist deflection of the cantilever;
   wherein the circuit element is communicably connected to the optical detector by a first feedback loop; and
   a feedback controller communicably connected to the piezotube and configured to modulate the piezotube along the Z-axis towards and away from the probe;
   wherein the feedback controller is communicably connected to the optical detector through a second feedback loop; and
   a switch communicably connected between the optical detector and the first and second feedback loops.

2. The high-speed atomic force microscope of claim 1 further comprising:
   a high voltage scanner;
   at least one high voltage amplifier communicably connected between the high voltage scanner and the piezotube; and
   wherein the high voltage scanner is configured generate a triangle wave to impel movement of the piezotube along an X- and a Y-axis.

3. The high-speed atomic force microscope of claim 1 wherein:
   the optical detector is configured such that a reading of a voltage at the optical detector is utilized to derive a deflection image of a sample;
   the circuit element is configured such that a reading of a voltage at the circuit element is utilized to derive a force image of a sample; and
   the feedback controller is configured such that a reading of a voltage at the feedback controller is utilized to derive a topographic image of a sample.

4. The high-speed atomic force microscope of claim 1 wherein the cantilever is approximately 55 μm wide and approximately 120 μm long.

5. The high-speed atomic force microscope of claim 1 wherein the circuit element comprises a zinc oxide stack.

6. The high-speed atomic force microscope of claim 1 wherein the feedback controller comprises an input and a force setpoint signal is fed into the input of the feedback controller to constrain modulation of the piezotube along the Z-axis to a predetermined range.

7. A method of creating a composite image of a sample using a high-speed atomic force microscope, the method comprising:
    placing a sample on a piezotube in proximity to a probe of a cantilever;
    measuring, with a detector, a deflection of the cantilever in response to a force between the sample and the probe;
    exerting a force on the cantilever, wherein the force is exerted by a circuit element connected to the cantilever to counteract the deflection of the cantilever;
    measuring the force exerted on the cantilever by the circuit element; and
    measuring a topographical force at a feedback controller connected to the piezotube; and
    switching between a first feedback loop comprising the detector and the circuit element, and a second feedback loop comprising the detector and the feedback controller.

8. The method of claim 7 further comprising moving the piezotube along at least one of an X- or Y-axis.

9. The method of claim 7 further comprising:
    transmitting a first signal from a detector configured to measure cantilever deflection to the circuit element configured to exert a force on the cantilever; and
    transmitting a second signal from the detector to the feedback controller.

10. The method of claim 7 wherein the measurement of the force exerted on the cantilever by the circuit element is done independently of the measurement of the topographical force.

11. The method of claim 7 further comprising moving the piezotube along at least one of an X- or a Y-axis.

12. The method of claim 11 further comprising moving the piezotube along a Z-axis.

13. A system for creating a concurrent deflection image, force image, and topographic image, the system comprising:
    a cantilever having a probe;
    a piezotube arranged in proximity to the probe; a sample arranged on the piezotube;
    an optical detector configured to detect deflection of the cantilever;
    a circuit element connected to the cantilever and configured to resist deflection of the cantilever, wherein the circuit element is connected to the optical detector through a first feedback loop; and
    a feedback controller connected to the piezotube and configured to modulate the piezotube along the Z-axis away from and towards the probe, wherein the feedback controller is connected to the optical detector through a second feedback loop; and
    a switch communicably connected between the optical detector and the first and second feedback loops.

14. The system of claim 13 further comprising a high voltage scanner communicably connected to the piezotube via at least one high voltage amplifier, and the high voltage scanner being configured to facilitate movement of the piezotube along an X- and a Y-axis 15. The system of claim 13 wherein:
    the optical detector is further configured to facilitate the creation of a deflection image of the sample;
    the circuit element is further configured to facilitate the creation of a force image of the sample;
    the feedback controller is further configured to facilitate the creation of a topographic image of the sample; and
    the deflection image, the force image, and the topographic image are correlated to yield a composite image.

16. The system of claim 13 further comprising:
    a signal corresponding to a force setpoint;
    the signal being transmitted to an input of the feedback controller; and
    the signal being configured to constrain modulation of the piezotube along the Z-axis.

17. The system of claim 13 wherein the cantilever is approximately 55 μm wide and approximately 120 μm long.

* * * * *